(12) United States Patent
Epp et al.

(10) Patent No.: US 6,349,859 B1
(45) Date of Patent: Feb. 26, 2002

(54) UNLOADING CHUTE AND AERATION SYSTEM FOR A PARTICULATE MATERIAL STORAGE BIN

(76) Inventors: Richard J. Epp; Dwayne S. Epp, both of Box 64, Fiske, Saskatchewan (CA), S0L 1C0

(*) Notice: Subject to any disclaimer, the term of this patent is extended or adjusted under 35 U.S.C. 154(b) by 0 days.

(21) Appl. No.: 09/883,028

(22) Filed: May 21, 2001

(51) Int. Cl.⁷ ................................................. B67D 5/06
(52) U.S. Cl. ...................................... 222/533; 222/413
(58) Field of Search ............................ 222/185.1, 412, 222/413, 533, 195

(56) References Cited

U.S. PATENT DOCUMENTS 6,237,813 B1   5/2001   Epp et al.

*Primary Examiner*—Philippe Derakshani
*Assistant Examiner*—Thach H. Bui
(74) *Attorney, Agent, or Firm*—Adrian D. Battison; Michael R. Williams

(57) ABSTRACT

A chute is provided for a grain storage bin to permit access of a grain auger to a center of the grain storage bin for center unloading the bin. The chute includes a pair of spaced apart side members arranged to receive the auger therebetween. A cover member between the side members extends longitudinally from an open end of the chute supported in alignment with the door opening of the bin to a free end supported above the center of the bin floor. A perforated aeration tube can be mounted on the chute for directing air from a fan through the door opening to the center of the bin. The aeration tube and the chute are pivotal together between a working position extending across the bin and a raised position spaced upwardly from the bin floor for cleaning the bin floor. The aeration tube can be used independently of the chute by pivotally mounting one end of the tube at an opening in the bin wall.

20 Claims, 5 Drawing Sheets

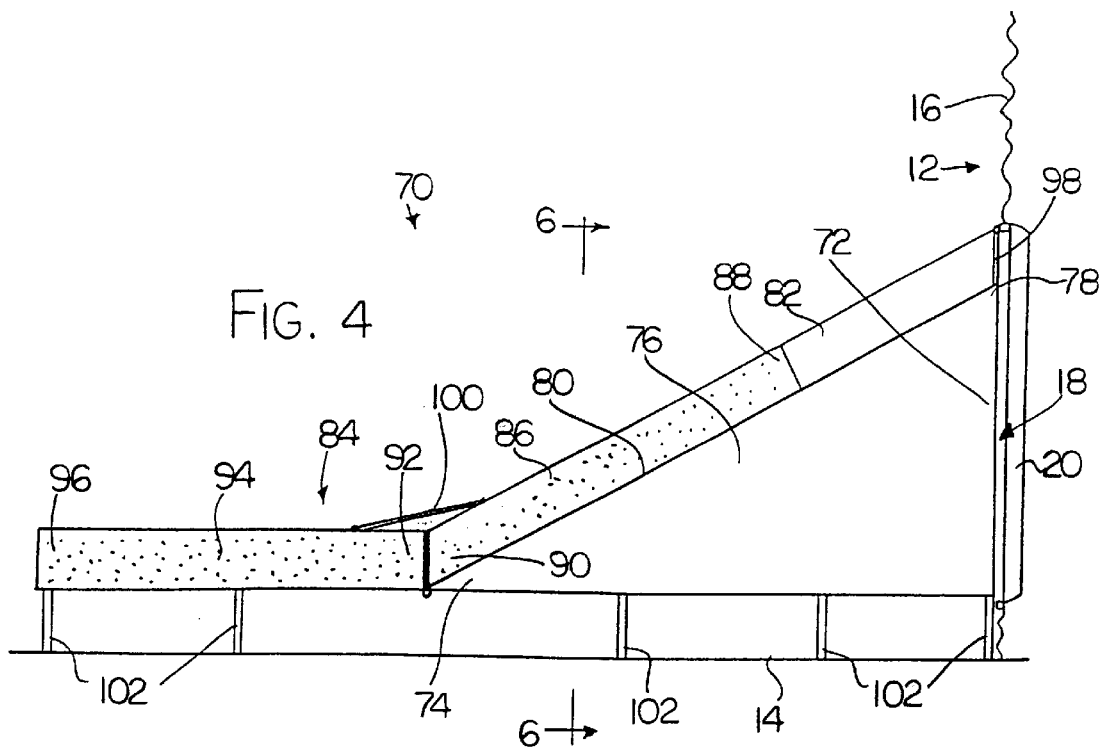
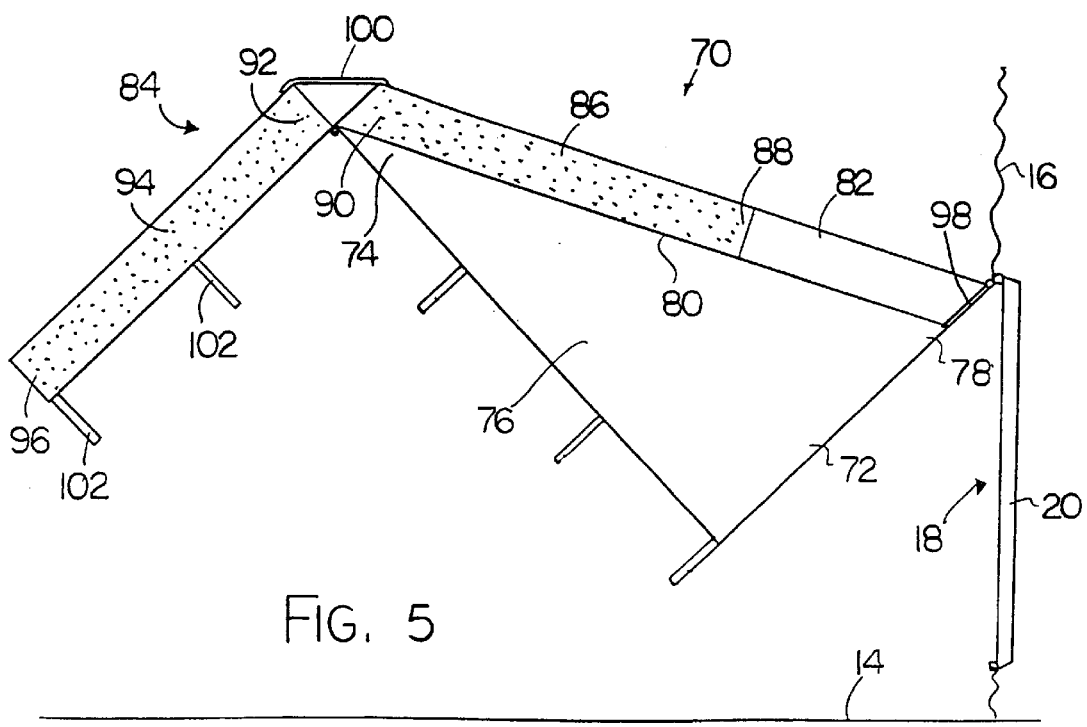

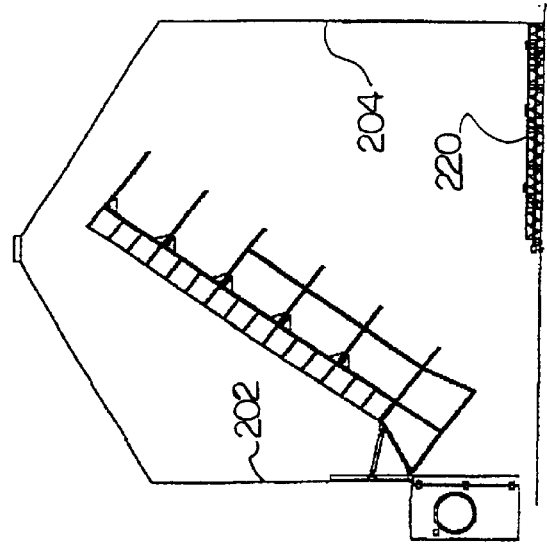
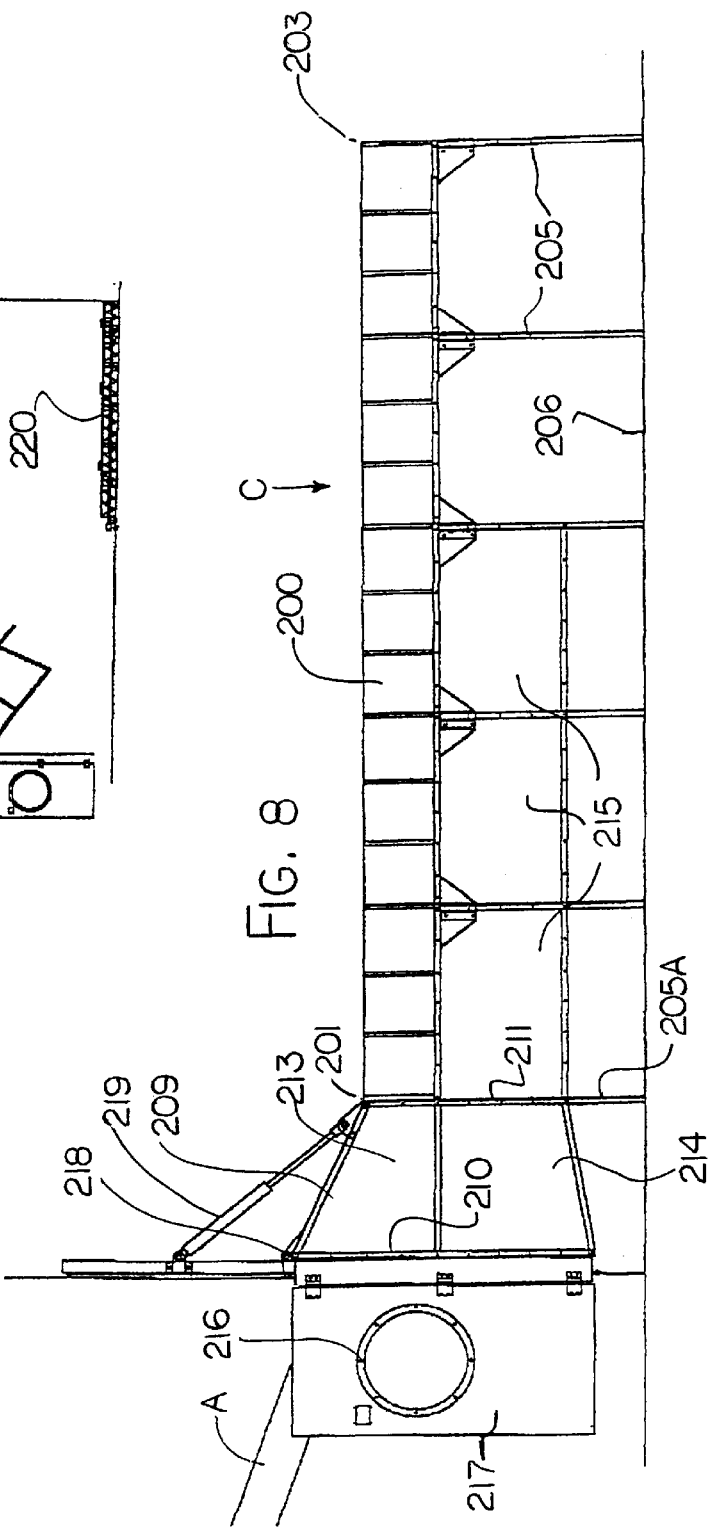

UNLOADING CHUTE AND AERATION SYSTEM FOR A PARTICULATE MATERIAL STORAGE BIN

FIELD OF THE INVENTION

The present invention relates to an unloading chute for a particulate material storage bin arranged to receive an auger tube therethrough and to an aeration system for the storage bin which can be used with the unloading chute.

BACKGROUND

Storage bins are commonly used for storing particulate material therein, for example grain and the like. Particulate material storage bins of this type generally have a circular bin floor with a cylindrical bin wall at a periphery of the floor.

When storing grain in such bins, it is a known practice to provide an aeration system for passing air through the grain to maintain the quality of the material stored in the bin. Known aeration systems however can restrict access to the bin floor when it is desired to unload the bin.

When unloading large bins it is desirable to unload the material towards a center of the bin. When large bins are unloaded from one side, the imbalance of the load of particulate material acting on the bin walls can cause failure of the bin walls or even cause the bin to tip over. Center unloading of large bins however generally requires expensive center unloading equipment.

A further requirement for many materials stored in such bins is to provide aeration by which the temperature and humidity of the materials can be controlled. On example of an aeration system is disclosed in prior Canadian Application No. 2,281,970 filed Sep. 17$^{th}$, 1999 and corresponding U.S. application Ser. No. 09/330,976 now issued as U.S. patent NOT YET KNOWN.

SUMMARY

According to one aspect of the present invention there is provided a chute for a storage bin comprising a circular bin floor, a cylindrical bin wall extending upwardly from the bin floor and a door opening in the cylindrical bin wall, the chute comprising:

a pair of spaced apart side members; and a cover member spanning between the pair of sides adjacent a top end of the side members;

the chute extending from an open end which is arranged to be supported on the bin wall in alignment with the door opening to a free end arranged to project inwardly from the bin wall towards a centre of the bin floor spaced above the bin floor;

the side members being suitably spaced apart for receiving an auger therebetween.

The arrangement of the chute permits large diameter bins to be unloaded with a conventional auger towards a center of the bin without the requirement of expensive center unloading equipment.

The open end of the chute is preferably arranged to be pivotally supported on the bin wall so as to be movable between a working position projecting inwardly from the bin wall towards the center of the bin floor and a raised position extending generally upwardly from the open end supported on the bin wall.

There may be provided a plurality of support members mounted on the chute and being arranged to support the chute on the bin floor spaced thereabove.

In one embodiment, the open end of the chute is preferably arranged to span substantially across a full width of the door opening. The chute may also be tapered from the open end which is arranged to span substantially across a full width of the door opening to the free end which is narrower in lateral dimension than the open end.

Alternatively, there may be provided a door panel arranged to span substantially across a full width of the door opening having an opening therein in communication with the open end of the chute. When the open end of the chute is arranged to be pivotally supported on the bin wall so as to be movable between a working position projecting inwardly from the bin wall towards the center of the bin floor and a raised position extending generally upwardly from the open end supported on the bin wall, the door panel is preferably movable with the chute between the respective working and raised positions.

The free end of the chute may be arranged to be supported above the centre of the bin floor when the open end of the chute is supported in alignment with the door opening.

There may be provided a lifting mechanism arranged to urge the chute upwardly from the working position to the raised position.

A perforated air discharge tube mounted on the chute extending in the longitudinal direction of the chute and an air supply duct arranged to communicate air from a fan at the door opening to the perforated air discharge tube when the open end of the chute is supported in alignment with the door opening.

The perforated air discharge tube may be formed into a plurality of longitudinal sections being movable relative to one another between a working position and a collapsed position in which the perforated air discharge tube is collapsed in length.

According to a second aspect of the present invention there is provided a chute for a storage bin comprising a circular bin floor, a cylindrical bin wall extending upwardly from the bin floor and a door opening in the cylindrical bin wall, the chute comprising:

a pair of spaced apart side members;

a cover member spanning between the pair of sides adjacent a top end of the side members;

the chute extending in a longitudinal direction of the chute from an open end which is arranged to be supported on the bin wall in alignment with the door opening to a free end projecting inwardly from the bin wall towards a centre of the bin floor spaced above the bin floor;

the side members being suitably spaced apart for receiving an auger therebetween;

a perforated air discharge tube mounted on the chute and extending in the longitudinal direction of the chute; and an air supply duct arranged to communicate air from a fan at the door opening to the perforated air discharge tube when the open end of the chute is supported in alignment with the door opening.

The air discharge tube is preferably supported along a top side of the chute.

The air supply duct may be arranged such that the perforated air discharge tube is substantially centred between the bin walls.

According to a further aspect of the present invention there is provided an aeration system for a storage bin comprising a circular bin floor, a cylindrical bin wall extending upwardly from the bin floor and an opening in the bin wall, the system comprising:

a perforated air discharge tube arranged to be pivotally supported on the bin wall for movement between a working position extending diametrically across the bin and a raised position extending generally upwardly from one side of the bin wall; and an air supply duct arranged to communicate air from a fan through the opening in the bin wall to the perforated air discharge tube in the working position.

The use of an aeration system which is arranged to be pivotally supported on the bin wall permits the perforated air discharge tube to be readily raised from the bin floor for cleaning out the bin upon unloading of particulate material therein.

The perforated air discharge tube is preferably arranged to be spaced above the bin floor in the working position to reduce static pressure when aerating the bin. There may be provided a plurality of support members arranged to support the perforated air discharge tube on the bin floor.

The air supply duct is preferably arranged such that the perforated air discharge tube is substantially centred between the bin walls in the working position.

There may be provided a lifting mechanism coupled to the air discharge tube being arranged to displace the air discharge tube between the respective working and raised positions.

BRIEF DESCRIPTION OF THE DRAWINGS

In the accompanying drawings, which illustrate an exemplary embodiment of the present invention:

FIG. 4 is a side elevational view of a further embodiment of the chute including an aeration tube mounted thereon in a working position.

FIG. 5 is a side elevational view of the chute according to FIG. 4 in a raised position.

FIG. 8 is a side elevational view of a yet further embodiment of the cover and aeration tube illustrated in a working position.

FIG. 9 is a side elevational view of the embodiment of FIG. 8 mounted in the bin and moved to a raised position.

DETAILED DESCRIPTION

Figure 1:
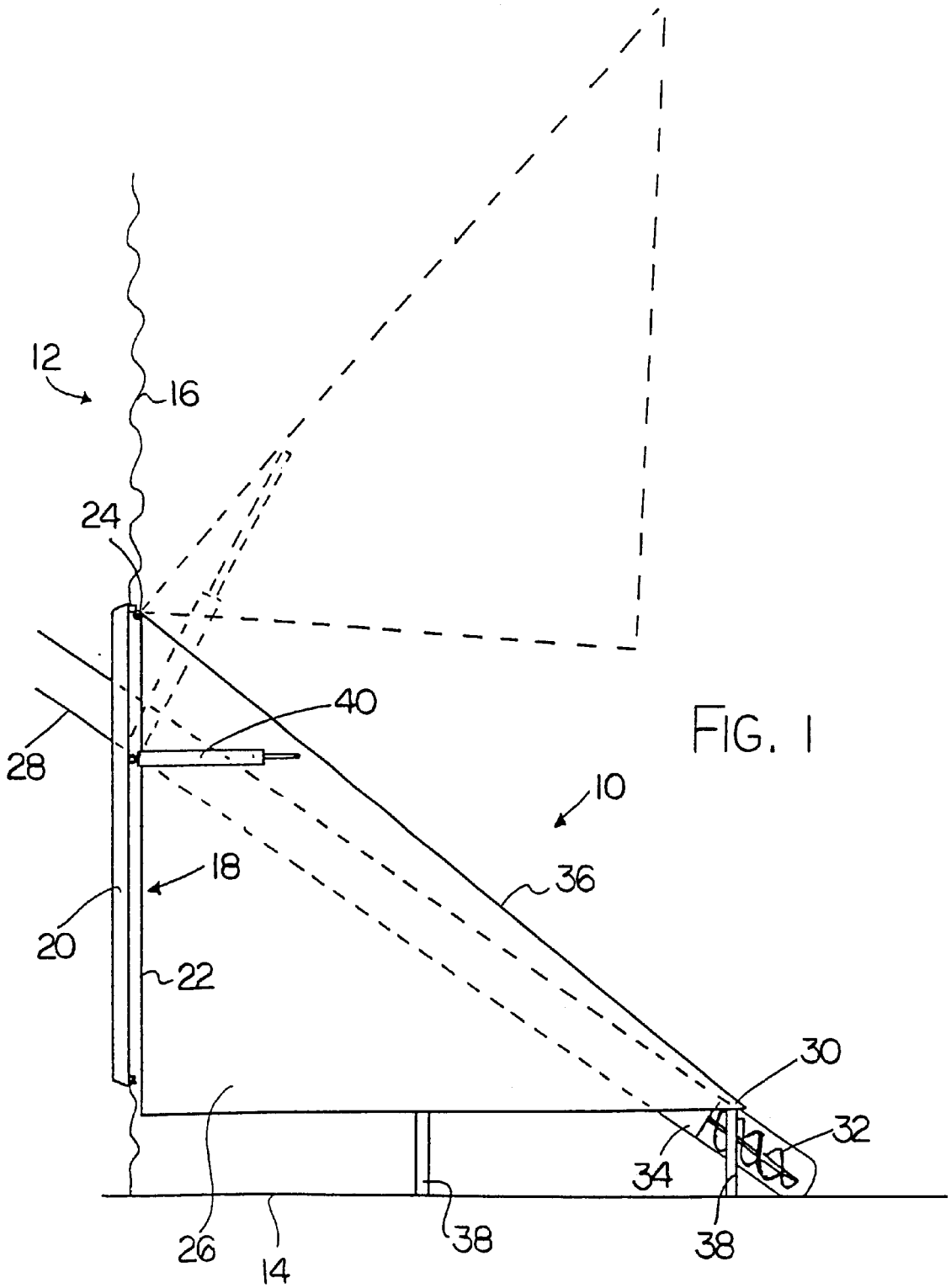
FIG. 1 is a side elevational view of a chute arranged to mount within a particulate material storage bin.
Figure 2:
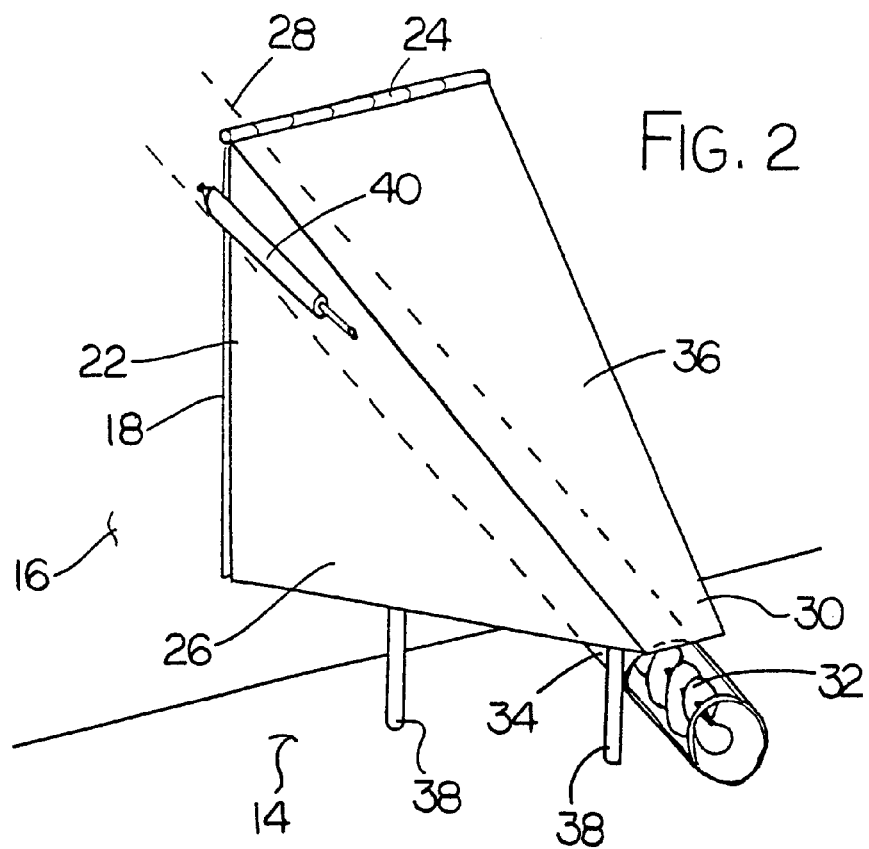
FIG. 2 is an isometric view of the chute according to FIG. 1.

Referring initially to FIGS. 1 and 2 there is illustrated a chute generally indicated by reference numeral 10. The chute is intended for use with a particulate material storage bin 12 of the type commonly used for storing grain therein.

The bin 12 includes a generally circular floor 14 and a cylindrical bin wall 16 extending upwardly from a periphery of the bin floor. The bin wall includes a rectangular door opening 18 therein adjacent the floor which is arranged to support a door 20 thereon for movement between a closed position spanning across the door opening and an opened position in which the door opening is unobstructed.

The chute 10 is pivotally mounted at an open end 22 of the chute on the bin wall 16. A pivotal mounting member 24 adjacent the top side of the door opening 18 supports the chute 10 thereon for pivotal movement about a lateral axis extending horizontally across the top of the door between a working position shown in solid line in FIG. 1 and a raised position shown in dotted line in that same figure.

The chute 10 includes a pair of side members 26 which are suitably spaced apart for receiving a grain auger 28 therebetween. At the open end 22 of the chute the side members 26 are spaced apart sufficiently to define an opening therebetween which spans substantially the full width of the door opening 18. When the chute 10 is positioned in the working position in alignment with the door opening 18, the side members 26 therefore restrict passage of grain through the door opening 18.

In the working position the side members 26 project inwardly from the opening in the side wall of the bin towards a free end 30 of the chute spaced directly above the center of the bin floor. The spacing between the side members 26 becomes narrower as the side members are tapered towards the free end 30 of the chute which is approximately the width of a conventional grain auger for receiving a feed section 32 of the auger flight projecting from the tube 34 of the auger. The auger flight at the feed section 32 of the auger is thus exposed at the center of the bin floor for center unloading of the storage bin.

The chute 10 further includes a cover member 36 spanning between the side members 26 adjacent a top end thereof. The cover member in the working position extends inwardly from the top of the door opening 18 at a downward incline towards the free end 30 of the chute. Similarly to the spacing between the side members 26 the width of the cover member 36 becomes narrower as it tapers towards the free end 30 of the chute.

A bottom side of each side member 26 extends generally horizontally across the bin floor spaced upwardly therefrom. The side members 26 extend downwardly from the top end of the door opening to the bottom end thereof spaced just below the bottom of the door opening 18 to prevent spillage of material in the bin 12 from spilling through the door opening 18 when the door 20 is open and the chute 10 is in place in the working position. A plurality of support legs 38 are mounted along the bottom side of each side member 26 for supporting the chute in the working position spaced above the bin floor.

A gas assisted shock 40 is mounted on each side of the door opening 18 between the bin wall and a respective one of the side members 26 for pivoting the chute upwardly as the shocks 40 are extended. As shown in dotted line in FIG. 1 when the shocks 40 are extended, the chute in the raised position extends generally upwardly at an inward incline from the top of the door opening 18 so as to permit access to the bin floor for cleaning out the bin in the raised position.

For center unloading of a particulate material storage bin, the chute 10 is mounted in the bin in the working position before the bin has been filled with particulate material. When it is desired to unload the bin, the bin door is opened and an auger is inserted through the chute towards the center of the bin. The funnel shape of the chute tapered from the open end to the free end at the center of the bin assists in guiding the feed section of the auger to the center of the bin. The free end of the chute being raised upwardly from the bin floor in the working position permits the flow of particulate material to pass under the free end of the chute where the feed section of the auger then conveys the material up the auger tube to a discharge end of the auger. Once the particulate material has been unloaded from the bin for the most part, the chute can be moved into the raised position permitting access for persons to clear the remaining particulate material from the bin floor.

Figure 3:
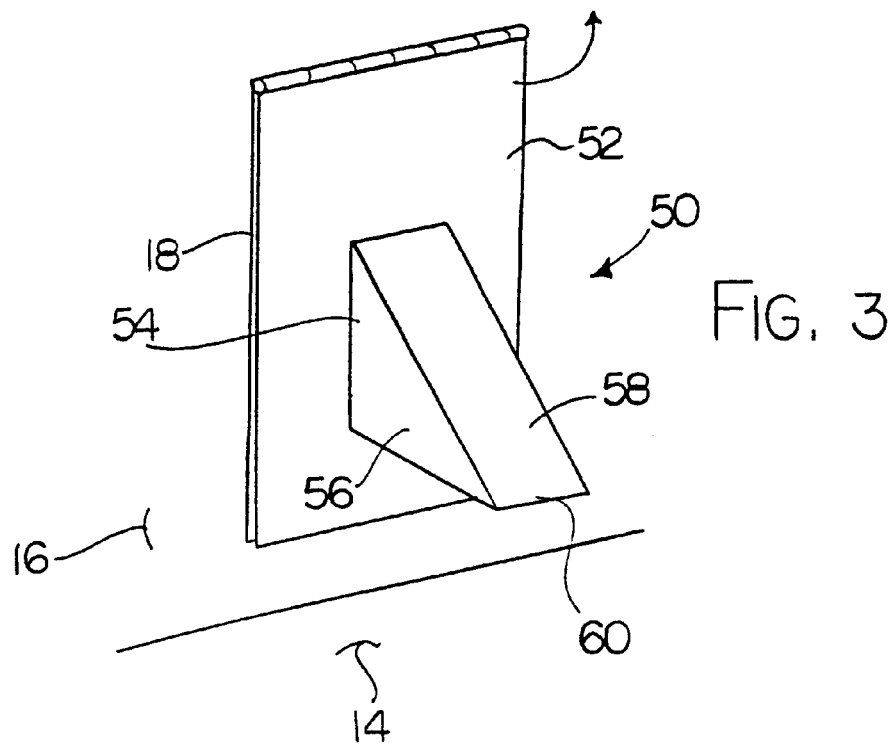
FIG. 3 is an isometric view of a chute according to a second embodiment of the present invention.

Turning now to FIG. 3 a second embodiment of a chute 50 is illustrated. The chute 50 projects inwardly towards the center of the bin from a door panel 52 which spans substantially the full width and height of the door opening 18. The door panel 52 is pivotally mounted at a top end across a top end of the door opening 18 about a laterally extending axis for movement of the chute 50 between a working position and a raised position similarly to the previous embodiment.

The door panel 52 includes an opening therein spaced upwardly from the bottom end thereof in communication with an open end 54 of the chute 50. The chute 50 includes a pair of side members 56 which extend inwardly from the door panel at the bin wall only partway towards a center of the bin. A cover member 58 spans between the side members 56 adjacent a top end thereof and extends at a downward incline from the open end 54 to a free end 60 of the chute 50. A bottom edge of the side members 56 extend generally horizontally spaced above the bin floor to the free end 60 of the chute spaced above the bin floor partway between one side of the bin wall and the center of the bin.

In use, similarly to the first embodiment, the bin is unloaded through the door opening in the bin wall when the bin door is opened by inserting the auger 28 through the chute such that a feed section of the auger is positioned more closely to the center of the bin than would normally be permitted if the chute at the door opening 18 was not provided. When the bin has substantially been unloaded of particulate material the chute 50 is pivoted upwardly with the door panel 52 about a lateral axis extending across the top of the door opening 18 to permit access to the bin floor through the door opening to clean out the remainder of the particulate material in the storage bin.

Figure 6:
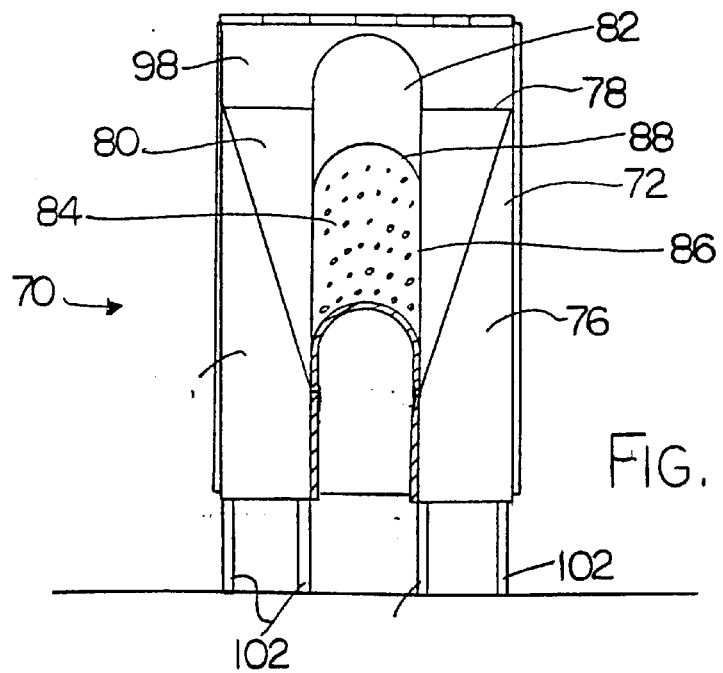
FIG. 6 is a partly section view along the line 6—6 of FIG. 4.

Turning now to FIGS. 4 through 6 there is illustrated a further embodiment of a chute generally indicated by reference numeral 70. Similarly to the first embodiment the chute 70 is tapered from an open end 72 at the door opening of the bin to a free end 74 spaced towards the center of the bin floor. The side members 76 of the chute 70 are spaced apart at the open end 72 substantially the full width of the door opening of the bin but are spaced below the top end of the door opening at a top end 78 of the chute 70. The cover member spanning between the side members 76 thus extends inwardly from the bin wall at a downward incline from the top end 78 of the chute spaced just below the top end of the door opening 18. As illustrated in FIG. 6 the spacing between the side members 76 and the width of the cover member 80 become narrower towards the free end 74 of the chute. The bottom end of the chute is supported horizontally above the bin floor just below a bottom end of the door opening similarly to the first embodiment.

At a top end 78 of the chute 70 and the top end of the door opening 18 the cover of the chute is perforated to form an aeration duct. The air duct 82 extends in the longitudinal direction of the chute inwardly from the bin wall along the cover member 80 of the chute.

The perforated air discharge duct 84 includes a first section 86 which extends longitudinally from an inlet air duct portion 82 along the cover member 80 of the chute. The duct 84 extends from a first end 88 which is coupled to the air duct 82 at a position spaced between respective ends of the chute to a second end 90 at the free end 74 of the chute which is spaced generally above the center of the bin floor.

The second end 90 of the first section of the perforated air discharge duct is arranged to communicate with an inner end 92 of a second section 94 of the perforated air discharge duct. The second section 94 extends substantially horizontally across the bin floor spaced above the bin floor substantially the same as the chute 70. The second section 94 extends in the longitudinal direction of the chute from the inner end 92 generally adjacent the center of the bin floor to a free end 96 towards an opposing side of the bin wall 16 from which the free end 96 is spaced therefrom.

The free end 96 of the second section and the first end 88 of the first section are arranged to be substantially equidistant from the center of the bin floor such that the perforated air discharge duct 84 is generally centered within the bin in the working position. The perforated air discharge duct 84 is thus arranged to discharge air through perforations therein which is received through the inlet portion 82 from a fan mounted outside the bin. The free end 96 of the second section is capped for discharging the air through the perforations in the tube evenly between the two sections.

Similarly to the previous embodiments, the chute is pivotally supported at the top end of the door opening in the bin wall for movement between a working position and a raised position for cleaning the bin. A mounting plate 98 is provided which spans between the opening from the top end 78 of the chute to the top end of the door opening 18 for supporting the chute 70 on the top end of the door opening. The mounting plate 98 includes a suitable opening therethrough in communication with an open end of the air duct 82 which comprises a solid round tube extending from the mounting plate 98 to the first end 88 of the first section of the perforated air discharge tube.

In the working position the chute thus extends to the center of the bin as in the first embodiment for receiving an auger through the door opening to unload particulate material from a center of the storage bin. The chute 70 as well as the air duct 82 and the first section 86 of the perforated air discharge tube are pivotal together with the mounting plate 98 about a laterally extending axis across the top of the door opening 18 into the raised position wherein the chute extends at a generally upward and inward incline.

The inner end 92 of the second section of the perforated air discharge duct is arranged to be pivotally coupled to a second end 90 of the first section at the free end of the chute 70 along a bottom side of the perforated air discharge tube to permit the tube to be collapsed in the raised position. As the chute 70 is pivoted upward into the raised position, the second section of the perforated air discharge duct 84 is thus pivoted downwardly at a free end 96 thereof for reducing the length of the perforated air discharge tube in the raised position.

A stop member 100 is coupled between the sections of the perforated air discharge tube along a top side thereof to limit the amount of pivotal displacement between the two. In the raised position the stop member 100 is thus supported in tension to suspend the second section of the perforated air discharge tube to extend downwardly at an outward incline from the free end 74 of the chute located centrally within the storage bin. A plurality of support legs 102 are provided along a bottom side of the chute 70 and the second section 94 of the perforated air discharge duct for supporting both parts spaced horizontally above the bin floor in the working position.

The combination of the chute 70 and the perforated air discharge duct 84 provided thereby permit either center unloading of a storage bin or aeration of the bin through the door opening in the bin wall. As in previous embodiments pivoting the chute upwardly into the raised position permits the bin floor to be cleaned out.

Figure 7:
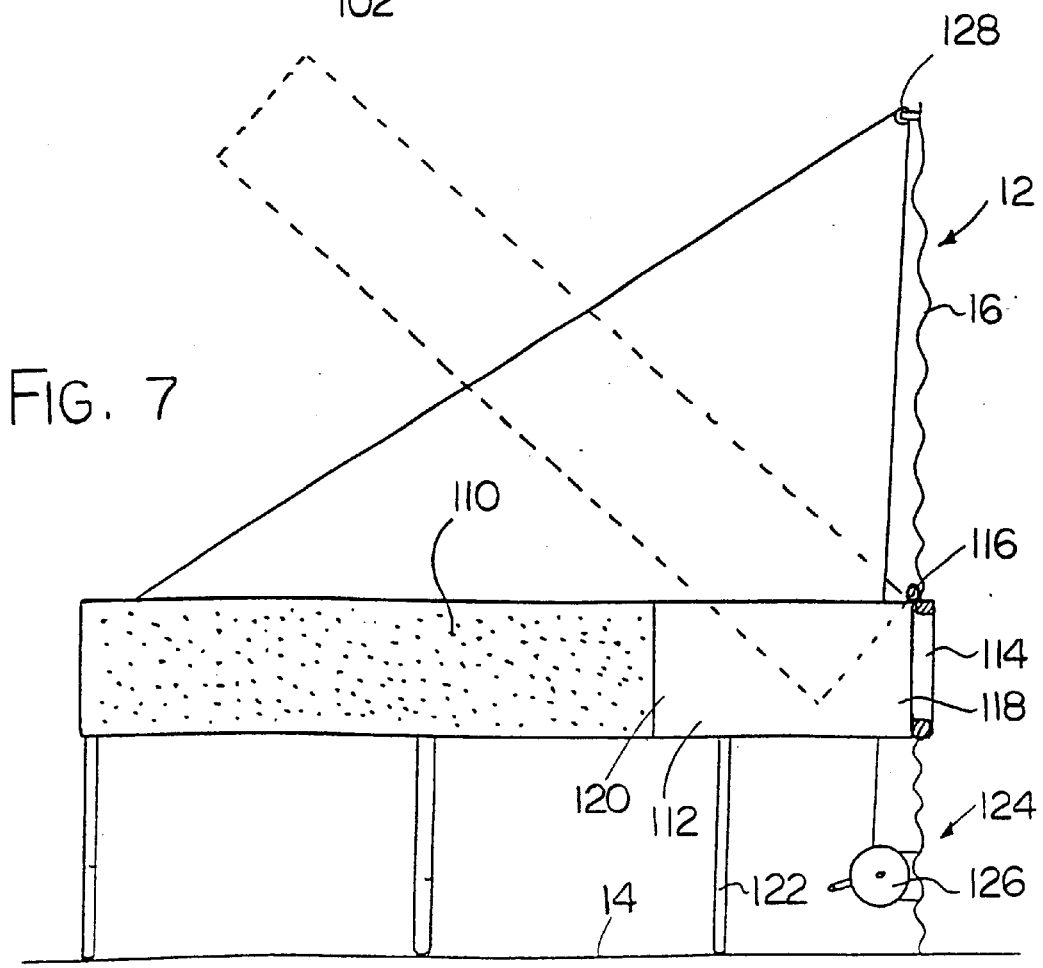
FIG. 7 is a side elevational view of a further embodiment of the aeration tube illustrated in a working position and shown in dotted line in a raised position.

As illustrated in FIG. 7 a further embodiment of the perforated air discharge tube 110 is illustrated. The perforated air discharge tube 110 comprises a round tube which is perforated and is connected co-axially and end to end with a solid round air duct 112. The duct 112 and the tube 110 are arranged to extend longitudinally inwardly from the bin wall 16 in communication with a circular opening 114 in the bin wall.

The air supply duct 112 is pivotally supported on the bin wall above the circular opening 114 by a pivotal mount 116 secured to a first end 118 of the air supply duct adjacent a top side thereof. The air supply duct 112 is thus pivotal between a working position in which the opening at the first end 118 thereof is in alignment with the circular opening 114 in the bin wall and a raised position in which the air supply duct extends generally upwardly at an inward incline from the bin wall.

The perforated air discharge tube 110 extends from a second end 120 of the air supply duct across a center of the bin floor to a free end of the tube which is spaced intermediately between the center of the bin and an opposing side of the bin wall. The length of the air supply duct 112 is arranged such that the perforated air discharge tube is positioned generally centered about the center of the storage bin extending horizontally spaced above the bin floor in the working position with ends thereof being substantially equidistant from the center of the bin.

The tube 110 is pivotal with air supply duct 112 about the pivotal mount 116 secured to the bin wall above the circular opening 114. A plurality of support legs 122 are mounted along a bottom side of the perforated air discharge tube 110 in the supply duct 12 for supporting the tube and duct above the bin floor in the working position.

A lift mechanism 124 is provided for raising the perforated air discharge tube into the raised position when it is desired to clean out the bin floor. The lift mechanism generally includes a winch 126 mounted on the bin wall for use in co-operation with a pulley 128 also mounted on the bin wall spaced above the circular opening 114. A cable extends from the winch 126 and around the pulley 128 to be anchored at a free end 130 of the cable on the free end of the perforated air discharge tube 110. Actuating the winch 126 through either a motor or a hand crank permits the cable to be wound thereon to raise the free end of the perforated air discharge tube so that the tube is pivoted about the pivotal mount above the circular opening 114 into the raised position.

In use the perforated air discharge tube 110 is normally positioned in the working position shown in solid line in FIG. 7 before the bin is filled with particulate material. When aeration of the particulate material is required a fan is coupled to the circular opening 114 on the outside of the bin wall for directing air through the air duct 112 to be subsequently discharged through perforations in the tube 110 to aerate the particulate material. Subsequently when the bin is unloaded the tube 110 may be raised into the raised position for cleaning out the bin floor as desired. When using a perforated air discharge tube which is in the order of two feet in diameter, the duct is preferably supported in the order of three to four feet from the floor to reduce static pressure build-up of air within the tube and the surrounding particulate material.

In FIGS. 8 and 9 is shown a similar arrangement in which the cover for the discharge auger also acts as an aeration system for the bin. Thus the cover comprises a semi-cylindrical upper section 200 which is formed from perforated metal so as to allow air to escape from under the cover upwardly into the grain within the bin. The semi-cylindrical portion extends from an inner end 201 adjacent one side wall 202 of the bin to a second end 203 adjacent the opposite side wall 204. The ends 201 and 203 are substantially equal distantly spaced from the side walls extending across a diameter of the bin so that the aeration effect occurs across the full width of the perforated arched cover section 200 substantially symmetrically within the bin.

The arched cover section is mounted on the plurality of legs 205 which extend downwardly from a bottom horizontal side edge of the arched cover section to the floor 206 of the bin with each side of the arched cover section being supported by a respective set of legs which are arranged in pairs along the length of the cover section.

At the end 201, the cover is attached to an inlet section 209 which converges in width and height from an end 210 at the door which matches the shape of the door to a second end 211 which matches the width of the arched cover section 200 and is attached at the innermost legs 205A. The inlet section 209 is formed from imperforate sheet metal including an upper cover section 213 and two side panels 214 extending downwardly from the cover section to a position adjacent to but spaced from the floor 206. In addition between the first three sets of legs there are provided depending side panels 215 which extend downwardly from the arched cover section to a position adjacent to but spaced from the floor 206.

Thus in this embodiment the arched cover section instead of being inclined downwardly in a first portion and then horizontal in the second portion forms a constant horizontal portion at a height spaced from the floor. The side cover panels 215 extend from the position at the inlet section 209 to a center C of the bin so as to define the chute previously described into which the auger A can be inserted for extracting material from the center of the bin as previously described. Thus during discharge, the inlet section and the first three sections of the arched cover act as the chute for discharging the material and allowing the auger to be readily inserted to the center of the bin. For this purpose the side panels 215 prevent the grain from entering underneath the arched cover section so as to leave a space between the side cover panels for receiving the auger A.

When the system is used for aeration, air is injected through an air supply duct 216 on the door 217 from a suitable fan arrangement. The air enters into the inlet section 209 and is communicated into the area underneath the perforated arched cover 200. The air thus escapes upwardly from the arched cover through the perforations in the arched cover while preventing the grain from falling through the perforations into the interior of the cover or chute. Air can also escape of course downwardly. The bottom of the arched section is open so that the air can escape into the grain underneath the arched section either at the bottom of the side panels 215 or directly underneath the arched cover section in the end two sections were there are no cover panels.

As shown in FIG. 9, the structure is sufficiently rigid so that the whole of the structure can be raised upwardly by pivotal action about a hinge 218 pulled by a hydraulic lifting device 219. Thus when the grain from the bin has been discharged sufficiently so that the level of grain is below the arched cover section, the chute and aeration duct assembly as shown in FIG. 9 can all be raised as a single element to a position upwardly in the bin allowing a bin sweep 220 to be operated within the bin for transporting the remaining grain material to the auger at the center of the bin.

The center of the bin can include a discharge pit of the arrangement shown in prior U.S. patent no: 6,237,813 corresponding to application Ser. No. 09/330,976 filed Jun. 14, 1999. This application corresponds to Canadian application Serial No: 2,281,970 filed Sep. 7, 1999. Attention is directed to this prior application for further details of the bin floor and pit arrangement.

While one embodiment of the present invention has been described in the foregoing, it is to be understood that other embodiments are possible within the scope of the invention. The invention is to be considered limited solely by the scope of the appended claims.

What is claimed is:

1. A chute for a storage bin having a circular bin floor, a cylindrical bin wall extending upwardly from the bin floor and a door opening in the cylindrical bin wall, the chute comprising:

a pair of spaced apart side members; and a cover member spanning between the pair of sides adjacent a top end of the side members;

the chute extending from an open end which is arranged to be supported at the bin wall in alignment with the door opening to a free end, with the chute arranged to project inwardly from the bin wall towards a centre of the bin floor and spaced above the bin floor;

the side members being suitably spaced apart for receiving an auger therebetween.

2. The chute according to claim 1 which is arranged to be pivotally supported on the bin wall so as to be movable between a working position projecting inwardly from the bin wall towards the center of the bin floor and a raised position extending generally upwardly from the open end supported on the bin wall.

3. The chute according to claim 1 wherein there is provided a plurality of support members mounted on the chute and being arranged to support the chute on the bin floor spaced thereabove.

4. The chute according to claim 1 wherein the open end of the chute is arranged to span substantially across a full width of the door opening.

5. The chute according to claim 1 wherein the chute is tapered from the open end which is arranged to span substantially across a full width of the door opening to the free end which is narrower in lateral dimension than the open end.

6. The chute according to claim 1 wherein there is provided a door panel arranged to span substantially across a full width of the door opening having an opening therein in communication with the open end of the chute.

7. The chute according to claim 6 wherein the open end of the chute is arranged to be pivotally supported on the bin wall so as to be movable between a working position projecting inwardly from the bin wall towards the center of the bin floor and a raised position extending generally upwardly from the open end supported on the bin wall, the door panel being movable with the chute between the respective working and raised positions.

8. The chute according to claim 1 wherein the free end of the chute is arranged to be supported above the centre of the bin floor when the open end of the chute is supported in alignment with the door opening.

9. The chute according to claim 2 wherein there is provided a lifting mechanism arranged to urge the chute upwardly from the working position to the raised position.

10. The chute according to claim 1 wherein at least a part of at least the cover of the chute is perforated to allow the passage of air and there is provided an air supply duct arranged to communicate air from a fan at the door opening to the perforated cover when the open end of the chute is supported in alignment with the door opening.

11. The chute according to claim 10 wherein the cover is formed into a plurality of longitudinal sections being movable relative to one another between a working position and a collapsed position.

12. A chute for a storage bin comprising a circular bin floor, a cylindrical bin wall extending upwardly from the bin floor and a door opening in the cylindrical bin wall, the chute comprising:

a pair of spaced apart side members;

a cover member spanning between the pair of sides adjacent a top end of the side members;

the chute extending in a longitudinal direction of the chute from an open end which is arranged to be supported on the bin wall in alignment with the door opening to a free end with the chute projecting inwardly from the bin wall towards a centre of the bin floor spaced above the bin floor;

the side members being suitably spaced apart for receiving an auger therebetween;

at least the cover being perforated to form an air discharge tube extending in the longitudinal direction of the chute; and an air supply duct arranged to communicate air from a fan at the door opening to the perforated air discharge tube when the open end of the chute is supported in alignment with the door opening.

13. The chute according to claim 12 wherein the air discharge tube is supported along a top side of the chute.

14. The chute according to claim 12 wherein the air supply duct is arranged such that the perforated air discharge tube is substantially centred between the bin walls.

15. An aeration system for a storage bin comprising a circular bin floor, a cylindrical bin wall extending upwardly from the bin floor and an opening in the bin wall, the system comprising:

a perforated air discharge tube arranged to be pivotally supported at the bin wall for movement between a working position extending diametrically across the bin and a raised position extending generally upwardly from one side of the bin wall; and an air supply duct arranged to communicate air from a fan through the opening in the bin wall to the perforated air discharge tube in the working position.

16. The aeration system according to claim 15 wherein the perforated air discharge tube is arranged to be spaced above the bin floor in the working position.

17. The aeration system according to claim 16 wherein there is provided a plurality of support members arranged to support the perforated air discharge tube on the bin floor.

18. The aeration system according to claim 15 wherein the air supply duct is arranged such that the perforated air discharge tube is substantially centred between the bin walls in the working position.

19. The aeration system according to claim 15 wherein there is provided a lifting mechanism coupled to the air discharge tube being arranged to displace the air discharge tube between the respective working and raised positions.

20. The aeration system according to claim 15 wherein there is provided a chute including a pair of spaced apart side members and a cover member spanning between the pair of sides adjacent a top end of the side members, the chute extending in a longitudinal direction from an open end which is arranged to be supported on the bin wall in alignment with the opening in the working position to a free end projecting inwardly from the bin wall towards a center of the bin floor spaced above the bin floor, the side members being suitably spaced apart for receiving an auger therebetween, the air discharge tube being mounted on the chute to extend in the longitudinal direction of the chute.

* * * * *